United States Patent
Hong et al.

(10) Patent No.: US 12,476,292 B2
(45) Date of Patent: Nov. 18, 2025

(54) METHOD FOR RECOVERING ACTIVE METAL OF LITHIUM SECONDARY BATTERY

(71) Applicant: SK INNOVATION CO., LTD., Seoul (KR)

(72) Inventors: Suk Joon Hong, Daejeon (KR); Hyeon Jung Kim, Daejeon (KR); Sung Real Son, Daejeon (KR); Dong Wook Ha, Daejeon (KR); Ji Min Kim, Daejeon (KR); Ji Yun Park, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 682 days.

(21) Appl. No.: 17/798,644

(22) PCT Filed: Jan. 25, 2021

(86) PCT No.: PCT/KR2021/000968
§ 371 (c)(1),
(2) Date: Aug. 10, 2022

(87) PCT Pub. No.: WO2021/162277
PCT Pub. Date: Aug. 19, 2021

(65) Prior Publication Data
US 2023/0048057 A1    Feb. 16, 2023

(30) Foreign Application Priority Data
Feb. 10, 2020  (KR) .......... 10-2020-0015869

(51) Int. Cl.
*H01M 10/54* (2006.01)
*C01D 7/07* (2006.01)
(Continued)

(52) U.S. Cl.
CPC .......... *H01M 10/54* (2013.01); *C01D 7/07* (2013.01); *H01M 4/505* (2013.01); *H01M 4/525* (2013.01); *H01M 2004/028* (2013.01)

(58) Field of Classification Search
CPC .......... C01D 15/02; C01D 15/08; C01D 7/07; C22B 23/043; C22B 23/0461;
(Continued)

(56) References Cited

U.S. PATENT DOCUMENTS
2015/0052739 A1    2/2015 Nilanjan

FOREIGN PATENT DOCUMENTS
CN    1871726 A  *  11/2006
CN    107017443 A     8/2017
(Continued)

OTHER PUBLICATIONS

Kim et al. KR101497041B1 English Machine Translation (Year: 2015).*
(Continued)

*Primary Examiner* — Sally A Merkling
*Assistant Examiner* — Jordan W Taylor
(74) *Attorney, Agent, or Firm* — The PL Law Group, PLLC

(57) ABSTRACT

In a method of recovering an active metal of a lithium secondary battery, a cathode active material mixture is prepared from a waste cathode of a lithium secondary. The cathode active material mixture is reacted with a reductive reaction gas to form a preliminary precursor mixture having a reduction degree of transition metal defined by Equation 1 in a range from 0.24 to 1.6. A lithium precursor is recovered from the preliminary precursor mixture. A lithium recovery ration is improved by adjusting the reduction degree of transition metal.

10 Claims, 1 Drawing Sheet

(51) Int. Cl.
   *H01M 4/02*   (2006.01)
   *H01M 4/505*  (2010.01)
   *H01M 4/525*  (2010.01)

(58) Field of Classification Search
   CPC ........... C22B 26/12; C22B 47/00; C22B 5/12; H01M 10/052; H01M 10/54; H01M 2004/028; H01M 4/505; H01M 4/525; Y02P 10/20; Y02W 30/84
   See application file for complete search history.

(56) References Cited

FOREIGN PATENT DOCUMENTS

| | | |
|---|---|---|
| CN | 108091956 A | 5/2018 |
| CN | 108220607 A | 6/2018 |
| CN | 108539309 A | 9/2018 |
| CN | 110408796 A | 11/2019 |
| JP | 2012-229481 A | 11/2012 |
| JP | 2018-120716 A | 8/2018 |
| JP | 2018-179692 A | 11/2018 |
| KR | 101497041 B1 * | 3/2015 |
| KR | 10-2015-0094412 A | 8/2015 |
| KR | 10-2015-0115531 A | 10/2015 |
| KR | 10-1563788 B1 | 11/2015 |
| KR | 10-1623930 B1 | 5/2016 |
| KR | 101897134 B1 * | 9/2018 |
| KR | 10-2020238 B1 | 9/2019 |
| KR | 10-2043711 B1 | 11/2019 |
| WO | WO 2007/129845 A1 | 11/2007 |
| WO | WO 2019/199015 A1 | 10/2019 |
| WO | WO-2020011765 A1 * | 1/2020 ............. C22B 1/005 |

OTHER PUBLICATIONS

Kisi, Rietveld analysis of powder diffraction patterns, 1994 (Year: 1994).*
Na et al. KR101897134B1 English Machine Translation (Year: 2018).*
Barker CN1871726A English (Year: 2006).*
Liu et al. J. Alloys and Compounds 2019, 783, 743-752 (Year: 2019).*
European Search Report For EP21753224.1 issued on Dec. 12, 2023 from European patent office in a counterpart European patent application.
Office action issued on Jan. 16, 2024 from China Patent Office in a counterpart China Patent Application No. 202180013245.6 (English translation is also submitted herewith.).
Lombardo Gabriele et al., "Chemical Transformations in Li-Ion Battery Electrode Materials by Carbothermic Reduction", ACS Sustainable Chemistry & ENGINEERING, vol. 7, No. 16, Aug. 19, 2019, pp. 13668-13679, XP055817837, ISSN: 2168-0485, DOI: 10.1021/acssuschemeng.8b06540.
Notice of Allowance issued on Oct. 1, 2024 from Japan Intellectual Property Office in a counterpart Japanese Patent Application No. 2022-548614 (English translation is also submitted herewith.).
International Search Report for PCT/KR2021/000968 mailed on May 4, 2021.

* cited by examiner

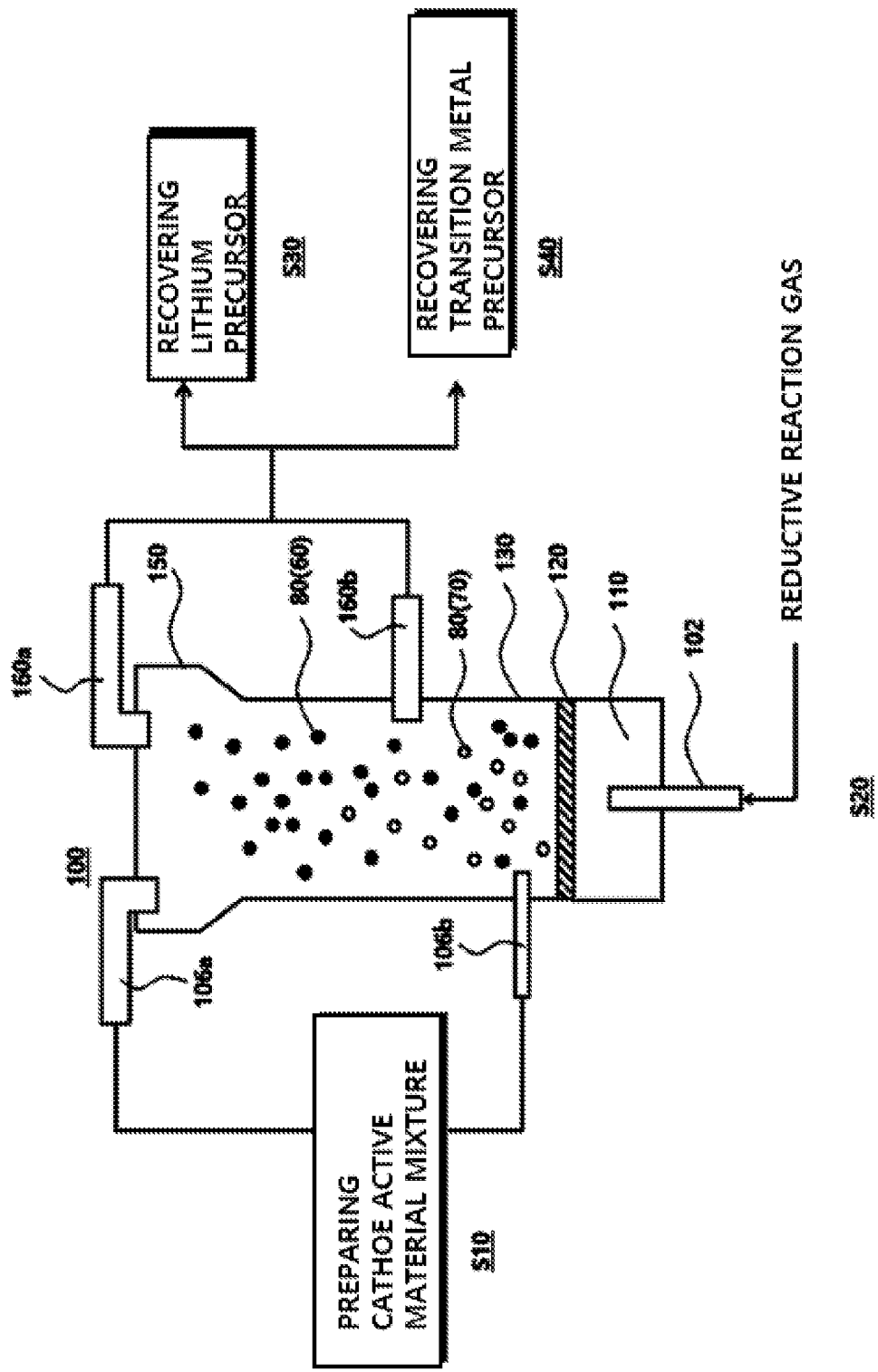

METHOD FOR RECOVERING ACTIVE METAL OF LITHIUM SECONDARY BATTERY

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2021/000968, filed Jan. 25, 2021, which claims priority to the benefit of Korean Patent Application No. 10-2020-0015869 filed in the Korean Intellectual Property Office on Feb. 10, 2020, the entire contents of which are incorporated herein by reference.

BACKGROUND

1. Technical Field

The present invention relates to a method for recovering an active metal of a lithium secondary battery. More particularly, the present invention relates to a method for recovering an active metal from a waste cathode of a lithium secondary battery.

2. Background Art

Recently, a secondary battery has been widely employed as a power source of a mobile electronic device such as a camcorder, a mobile phone, a laptop computer, etc., and a vehicle such as an electric vehicle, a hybrid vehicle, etc. A lithium secondary battery is highlighted among the secondary battery due to advantages such as high operational voltage and energy density per unit weight, a high charging rate, a compact dimension, etc.

A lithium metal oxide may be used as an active material for a cathode of the lithium secondary battery. The lithium metal oxide may further contain a transition metal such as nickel, cobalt, manganese, etc.

As the above-mentioned high-cost valuable metals are used for the cathode active material, 20% or more of a production manufacturing cost is required for manufacturing the cathode material. Additionally, as environment protection issues have recently been highlighted, a recycling method of the cathode active material is being researched.

Conventionally, a method of sequentially recovering the valuable metals by leaching a waste cathode active material in a strong acid such as sulfuric acid has been used, but the wet process may be disadvantageous in aspect of a regeneration selectivity and a regeneration time, and may cause environmental pollution. Therefore, a method for recovering the valuable metals using a dry-based reaction is being researched.

For example, a method of regenerating or recovering lithium through a dry reductive reaction is being researched, and precise control of reaction equipment and reaction conditions is required to increase a lithium recovery ratio.

For example, Korean Registered Patent Publication No. 10-0709268 discloses an apparatus and a method for recycling a waste manganese battery and an alkaline battery, but does not provide a dry-based method for regenerating valuable metals with high selectivity and high yield.

SUMMARY

According to an aspect of the present invention, there is provided a method for recovering an active metal of a lithium secondary battery with high efficiency and high purity.

In a method of recovering an active metal of a lithium secondary battery according to embodiments of the present invention, a cathode active material mixture including a lithium-transition metal oxide is prepared from a waste cathode of a lithium secondary battery. The cathode active material mixture is reacted with a reductive reaction gas to form a preliminary precursor mixture having a reduction degree of transition metal defined by Equation 1 in a range from 0.24 to 1.6. A lithium precursor is recovered from the preliminary precursor mixture:

reduction degree of transition metal=(MeO phase fraction+lithium-transition metal oxide phase fraction)/(Me phase fraction)   [Equation 1]

(In Equation 1, Me includes Ni and Co, the MeO phase fraction, the lithium-transition metal oxide phase fraction and the Me phase fraction are measured by a Rietveld crystal structure analysis for X-ray diffraction (XRD) analysis peaks of the preliminary precursor mixture).

In some embodiments, the lithium-transition metal oxide may be represented by Chemical Formula 1.

$\text{Li}_x\text{Ni}_a\text{Co}_b\text{Mn}_c\text{O}_y$   [Chemical Formula 1]

(In Chemical Formula 1, $0<x\le1.1$, $2\le y\le2.02$, $0<a<1$, $0<b<1$, $0<c<1$, $0<a+b+c\le1$).

In some embodiments, the reductive reaction gas may include hydrogen and a carrier gas, and a hydrogen concentration in the reductive reaction gas may be in a range from 10 to 40 vol %.

In some embodiments, a reaction temperature with the reductive reaction gas may be in a range from 400 to 600° C.

In some embodiments, the preliminary precursor mixture may include preliminary lithium precursor particles and transition metal-containing particles, and the transition metal-containing particles may include Ni, Co, NiO, CoO and MnO.

In some embodiments, the preliminary lithium precursor particles may include at least one of lithium hydroxide, lithium oxide and lithium carbonate.

In some embodiments, the recovering the lithium precursor may include washing the preliminary lithium precursor particles with water.

In some embodiments, the transition metal-containing particles may be selectively treated with an acid solution to recover a transition metal precursor in the form of an acid salt.

In some embodiments, the reduction degree of transition metal of the preliminary precursor mixture may be in a range from 0.24 to 1.0.

In some embodiments, in the forming the preliminary precursor mixture, the cathode active material mixture may be reacted with the reductive reaction gas in a fluidized bed reactor.

According to the above-described exemplary embodiments, a lithium precursor may be recovered from a waste cathode active material by a dry-based process utilizing a dry reductive process. Accordingly, the lithium precursor may be obtained with high purity without an additional process resulting from a wet-based process.

In exemplary embodiments, a ratio of a fraction of a transition metal oxide phase relative to a fraction of a transition metal phase after the dry reductive process may be adjusted to provide an appropriate reduction degree for a lithium recovery. Accordingly, a recovery ratio of a desired lithium precursor may be increased while efficiently extracting lithium from a lithium transition metal oxide and preventing a metal aggregation.

BRIEF DESCRIPTION OF THE DRAWINGS

FIG. 1 is a schematic flow diagram for describing a method of recovering an active metal of a lithium secondary battery in accordance with exemplary embodiments.

DETAILED DESCRIPTION

Embodiments of the present invention provide a method of recovering an active metal from a lithium secondary battery with high-purity and high-yield using a dry reductive reaction.

Hereinafter, embodiments of the present invention will be described in detail with reference to the accompanying drawings. However, the embodiments are provided as examples and the present invention is not limited to the specific embodiments described herein.

As used herein, the term "precursor" is used to comprehensively refer to a compound including a specific metal to provide the specific metal included in an electrode active material.

FIG. 1 is a schematic flow diagram for describing a method of recovering an active metal of a lithium secondary battery in accordance with exemplary embodiments. For convenience of descriptions, FIG. 1 shows a schematic diagram of a reactor together with a process flow.

Referring to FIG. 1, a cathode active material mixture (e.g., a waste cathode active material mixture) may be prepared from a waste cathode of a lithium secondary battery (e.g., S10 process).

The lithium secondary battery may include an electrode assembly including the cathode, an anode and a separation layer interposed between the cathode and the anode. The cathode and the anode may include a cathode active material layer and an anode active material layer coated on the cathode current collector and the anode current collector, respectively.

For example, the cathode active material included in the cathode active material layer may include an oxide including lithium and a transition metal.

In some embodiments, the cathode active material may include a compound represented by Chemical Formula 1 below.

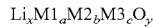
[Chemical Formula 1]

In Chemical Formula 1, M1, M2 and M3 may be a transition metal selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, $0<x\leq1.1$, $2\leq y\leq2.02$, $0<a<1$, $0<b<1$, $0<c<1$, and $0<a+b+c\leq1$.

In some embodiments, the cathode active material may be an NCM-based lithium oxide including nickel, cobalt and manganese.

A waste cathode may be recovered by separating the cathode from a waste lithium secondary battery. The waste cathode may include the cathode current collector (e.g., aluminum (Al)) and the cathode active material layer as described above, and the cathode active material layer may include a conductive material and a binder together with the above-described cathode active material.

The conductive material may include, e.g., a carbon-based material such as graphite, carbon black, graphene, carbon nanotube, etc. The binder may include a resin material, e.g., vinylidenefluoride-hexafluoropropylene copolymer (PVDF-co-HFP), polyvinylidenefluoride (PVDF), polyacrylonitrile, polymethylmethacrylate, etc.

In exemplary embodiments, the recovered waste cathode may be pulverized to produce a cathode active material mixture. Accordingly, the cathode active material mixture may be prepared in a powder form.

As described above, the cathode active material mixture may include a powder of a lithium-transition metal oxide, e.g., an NCM-based lithium oxide powder (e.g., Li(NCM)O$_2$). In this case, in the NCM-based lithium oxide powder, M1, M2 and M3 in Chemical Formula 1 may be Ni, Co and Mn, respectively.

The term "cathode active material mixture" used in the present application may refer to a raw material subjected to a reductive reaction treatment as will be described later after the cathode current collector is substantially removed from the waste cathode. In an embodiment, the cathode active material mixture may include cathode active material particles such as the NCM-based lithium oxide. In an embodiment, the cathode active material mixture may partially include a component derived from the binder or the conductive material. In an embodiment, the cathode active material mixture may substantially consist of the cathode active material particles.

In some embodiments, an average particle diameter (D$_{50}$) of the cathode active material mixture may be from 5 to 100 μm. Within the above range, the lithium-transition metal oxide such as Li(NCM)O$_2$ to be recovered may be easily separated from the cathode current collector, the conductive material and the binder included in the cathode active material mixture.

In some embodiments, the cathode active material mixture may be heat-treated before being introduced into a reducing reactor to be described later. By the heat treatment, impurities such as the conductive material and the binder included in the waste cathode active material mixture may be removed or reduced, and the lithium-transition metal oxide may be introduced into the reducing reactor with high purity.

A temperature of the heat treatment may be, e.g., from about 100 to 500° C., preferably from about 350 to 450° C. Within the above range, the impurities may be substantially removed while preventing decomposition and damages of the lithium-transition metal oxide.

For example, in a process of S20, the cathode active material mixture may be reacted in a reducing reactor 100 to form a preliminary precursor mixture 80.

As illustrated in FIG. 1, the reducing reactor 100 may be divided into a reactor body 130, a lower reactor portion 110 and an upper reactor portion 150. The reactor body 130 may include or may be integrated with a heating tool such as a heater.

The cathode active material mixture may be supplied into the reactor body 130 through supply flow paths 106a and 106b. The cathode active material mixture may be dropped through a first supply flow path 106a connected to the upper reactor portion 150, or may be introduced through a second supply flow path 106b connected to a bottom of the reactor body 130. In an embodiment, the first and second supply flow paths 106a and 106b may be used together to supply the waste cathode active material mixture.

For example, a supporting unit 120 may be disposed between the reactor body 130 and the lower reactor portion 110 so that the powders of the waste cathode active material mixture may be seated. The supporting unit 120 may include pores or injection holes through which a reductive reaction gas and/or a carrier gas, which will be described later, may pass.

The reductive reaction gas for converting the cathode active material mixture into a preliminary precursor may be supplied into the reactor body 130 through a reactive gas flow path 102 connected to the lower reactor portion 110. In some embodiments, the reductive reaction gas may include hydrogen ($H_2$). The reductive reaction gas may further include a carrier gas such as nitrogen ($N_2$), argon (Ar), etc.

The reductive reaction gas may be supplied from a bottom portion of the reducing reactor 100 to be in contact with the cathode active material mixture, so that the cathode active material mixture may react with the reductive reaction gas while moving to the upper reactor portion 150 or residing in the reactor body 130 to be converted into the preliminary precursor.

In some embodiments, the reductive reaction gas may be injected to form a fluidized bed in the reactor body 130. Accordingly, the reducing reactor 100 may be a fluidized bed reactor. The cathode active material mixture and the reductive reaction gas may contact each other in the fluidized bed while rising, staying and falling repeatedly, so that a reaction contact time may be increased and dispersion of particles may be improved. Thus, a preliminary precursor mixture 80 having a uniform size may be obtained.

However, the present inventive concepts are not necessarily limited to the fluidized bed reaction. For example, a stationary reaction in which the reductive reaction gas is supplied after preloading the cathode active material mixture in a batch reactor or a tubular reactor may be performed.

The reductive reaction gas may be supplied from the lower portion of the reducing reactor 100 to contact the cathode active material mixture, so that the cathode active material mixture may move to the upper reactor portion 150 while expanding a reaction area and may be converted into the preliminary precursor.

In some embodiments, the lithium-transition metal oxide may be reduced by the reductive reaction gas to generate a preliminary lithium precursor including, e.g., lithium oxide (e.g., $LiO_2$), lithium hydroxide (LiOH), etc., and a transition metal or transition metal oxide. For example, Ni, Co, NiO, CoO and MnO may be produced together with lithium oxide by a reductive reaction.

For example, as the reduction process progresses, a $Li(NCM)O_2$ crystal structure may be collapsed, and Li may be released from the crystal structure. NiO and CoO may be generated from the crystal structure, and as the reduction process continues, Ni and Co phases may be generated together.

Accordingly, the preliminary precursor mixture 80 including preliminary lithium precursor particles 60 and transition metal-containing particles 70 (e.g., the transition metal or transition metal oxide) may be formed. The preliminary lithium precursor particles 60 may include, e.g., lithium hydroxide (LiOH), lithium oxide ($LiO_2$), and/or lithium carbonate ($LI_2CO_3$).

The transition metal-containing particles 70 may include Ni, Co, NiO, CoO and MnO as described above.

In exemplary embodiments, a reduction degree of transition metal measured by an X-ray diffraction analysis (XRD) and defined by Equation 1 of the preliminary precursor mixture 80 may be in a range from 0.24 to 1.6.

Reduction degree of transition metal=(MeO phase fraction+lithium-transition metal oxide phase fraction)/(Me phase fraction) [Equation 1]

In Equation 1 above, Me includes Ni and Co. For example, the MeO phase may be a mole fraction of NiO and CoO phases in the preliminary precursor mixture produced by the reduction process. The Me phase may be a mole fraction of Ni and Co in the preliminary precursor mixture produced by the reduction process.

The lithium-transition metal oxide phase fraction in Equation 1 may represent, e.g., a fraction of unreacted or non-collapsed lithium-transition metal oxide by the above-described reduction process. The lithium-transition metal oxide may represent an NCM-based lithium oxide, and may be represented by Chemical Formula 1-1 below.

$Li_xNi_aCo_bMn_cO_y$ [Chemical Formula 1-1]

(In Chemical Formula 1-1, $0<x\leq1.1$, $2\leq y\leq2.02$, $0<a<1$, $0<b<1$, $0<c<1$, $0<a+b+c\leq1$).

The mole fractions may be obtained through a crystal structure analysis through a Rietveld method for peaks obtained from the XRD analysis.

If the reduction degree of transition metal is less than 0.24, the transition metals may be excessively reduced to generate a large amount of metal aggregates. Accordingly, formation of a sufficient fluidized bed in the reactor body 130 may be inhibited, and the metal aggregates may adhere to an inner wall of the reactor body 130 to prevent the formation of the preliminary lithium precursor particles 60.

If the reduction degree of transition metal exceeds 1.6, the collapse of the crystal structure of the lithium-transition metal compound may not be sufficiently induced. Accordingly, a lithium precursor recovery ratio may decrease because Li ions may not be sufficiently released.

The reduction degree of transition metal may be finely controlled using process conditions such as, e.g., a hydrogen concentration in the reductive reaction gas, a flow rate of the reductive reaction gas, a reaction temperature, a reductive reaction time, etc.

In a preferable embodiment, the reduction degree of transition metal defined by Equation 1 may be in a range from 0.24 to 1.0.

In an embodiment, the hydrogen concentration in the reductive reaction gas may be in a range from about 10 to 40 volume % (vol %). As described above, the reductive reaction gas may be a mixed gas of hydrogen and the carrier gas, and the hydrogen concentration may be a volume % of hydrogen in a total volume of the mixed gas.

A temperature of the reductive reaction may be controlled in a range from about 400 to 800° C., preferably in a range from about 400 to 600° C., more preferably in a range from about 400 to 500° C.

The preliminary precursor mixture 80 obtained through the above-described dry reduction process may be collected for a subsequent recovery process.

In an embodiment, the transition metal-containing particles 70 including nickel, cobalt or manganese may be relatively heavier than the preliminary lithium precursor particles 60, and thus the preliminary lithium precursor particles 60 may be discharged in advance through outlets 160a and 160b to be collected.

In an embodiment, the preliminary lithium precursor particles 60 may be discharged through a first outlet 160a connected to the upper reactor portion 150. In this case, a selective recovery of the preliminary lithium precursor particles 60 according to a weight gradient may be promoted.

In an embodiment, the preliminary precursor mixture 80 including the preliminary lithium precursor particles 60 and the transition metal-containing particles 70 may be collected through a second outlet 160b connected to the reactor body 130. In this case, the preliminary precursor mixture 80 may be directly recovered from a fluidized bed forming region to increase a production yield.

In an embodiment, the preliminary precursor mixture 80 may be collected together through the first and second outlets 160a and 160b.

The preliminary lithium precursor particles 60 collected through the outlet 160 may be recovered as a lithium precursor (e.g., S30 process).

In some embodiments, the preliminary lithium precursor particles 60 may be washed with water. The preliminary lithium precursor particles in the form of lithium hydroxide (LiOH) may be substantially dissolved in water, separated from the transition metal precursor and recovered in advance by the washing treatment. The lithium precursor substantially consisting of lithium hydroxide may be obtained through a crystallization process, etc., of lithium hydroxide dissolved in water.

In an embodiment, the preliminary lithium precursor particles in the form of lithium oxide and lithium carbonate may be substantially removed through the washing treatment. In an embodiment, the preliminary lithium precursor particles in the form of lithium oxide and lithium carbonate may be at least partially converted into lithium hydroxide through the washing treatment.

In some embodiments, the preliminary lithium precursor particles 60 may be reacted with a carbon-containing gas such as carbon monoxide (CO), carbon dioxide ($CO_2$), etc., to obtain lithium carbonate (e.g., $Li_2CO_3$) as the lithium precursor. A crystallized lithium precursor may be obtained through the reaction with the carbon-containing gas. For example, lithium carbonate may be collected by injecting the carbon-containing gas together during the washing treatment.

A temperature of the crystallization reaction using the carbon-containing gas may be, e.g., in a range from about 60 to 150° C. In the above temperature range, lithium carbonate with high reliability may be produced without damages to a crystal structure.

As described above, according to exemplary embodiments, the lithium precursor may be recovered from the waste cathode through a continuous dry process.

In a comparative example, a wet process such as a leaching with a strong acidic solution may be used to recover lithium or the transition metal from the waste secondary battery. However, a selective separation of lithium is limited in the wet process. Additionally, a washing process is required to remove solution residues, and by-products such as a hydrate may be increased due to a solution contact.

However, according to embodiments of the present invention, the lithium precursor may be collected through the dry reductive reaction in which the use of a solution is excluded, so that the production yield may be increased and the by-products may be decreased, and an environmentally friendly process design without a need for a wastewater treatment may be implemented.

Further, the reduction degree of transition metal may be controlled to promote a lithium extraction, and the lithium precursor may be recovered with high purity and high yield while preventing the metal aggregation.

In some embodiments, a transition metal precursor may be obtained from the collected transition metal-containing particles 70 (e.g., S40 process).

For example, the preliminary lithium precursor particles 60 may be collected through the outlets 160a and 160b, and then the transition metal-containing particles 70 may be recovered. Thereafter, the transition metal-containing particles 70 may be treated with an acid solution to form precursors in the form of acid salts of each transition metal.

In an embodiment, the preliminary lithium precursor particles 60 and the transition metal-containing particles 70 may be collected together and the washing process may be performed. In this case, the preliminary lithium precursor particles 60 may be converted and dissolved into the lithium precursor such as lithium hydroxide, and the transition metal-containing particles 70 may be precipitated. The precipitated transition metal-containing particles 70 may be collected again and treated with the acid solution.

In an embodiment, sulfuric acid may be used as the acid solution. In this case, $NiSO_4$, $MnSO_4$ and $CoSO_4$ may each be recovered as the transition metal precursor.

As described above, the lithium precursor may be collected through a dry process, and then the transition metal precursors may be selectively extracted using the acid solution, so that purity and selectivity of each metal precursor may be improved, and a load of the wet process may be reduced, and amount of wastewater and by-products may also be reduced.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example 1

1 kg of a cathode material separated from a waste lithium secondary battery was heat-treated at 450° C. for 1 hour. The heat-treated cathode material was cut into small units and pulverized by milling to obtain a sample of the Li—Ni—Co—Mn oxide cathode active material. 20 g of the cathode active material sample was put into a fluidized bed reactor, and a mixed gas of 20 vol % hydrogen/80 vol % nitrogen was injected from a bottom of the reactor at a flow rate of 400 mL/min for 4 hours while an internal temperature of the reactor was maintained at 455° C. to obtain a preliminary precursor mixture.

After measuring a reduction degree of transition metal using an XRD analysis of the obtained preliminary precursor mixture, the preliminary precursor mixture and water (19 times; weight basis) were added and stirred. A concentration of lithium dissolved in water was analyzed to measure a lithium recovery ratio based on a weight ratio of lithium dissolved in water relative to a weight of lithium in the initial cathode active material sample.

Example 2

A process the same as that in Example 1 was performed except that the reaction time was changed to 3 hours.

Example 3

2 g of the same cathode active material sample as that in Example 1 was put into a tubular reactor. An internal temperature of the reactor was maintained at 450° C., and a mixed gas of 40 vol % hydrogen/60 vol % nitrogen was injected at a flow rate of 50 mL/min for 3 hours to obtain a preliminary precursor mixture. Thereafter, the reduction degree of transition metal and the lithium recovery ratio were measured by the same method as that in Example 1.

Example 4

A process the same as that in Example 3 was performed except that the reaction temperature was adjusted to 430° C.

and a mixed gas of 20 vol % hydrogen/80 vol % nitrogen was injected at a flow rate of 50 mL/min for 5 hours.

Example 5

A process the same as that in Example 2 was performed except that a mixed gas of 15 vol % hydrogen/80 vol % nitrogen was used.

Comparative Example 1

A process the same as that in Example 1 was performed except that the reaction temperature was changed to 470° C. and the reaction time was 3 hours.

Comparative Example 2

A process the same as that in Example 3 was performed except that the reaction temperature was maintained at 450° C. and a mixed gas of 12.5 vol % hydrogen/87.5 vol % nitrogen was injected at a flow rate of 50 mL/min for 5 hours.

Comparative Example 3

A process the same as that in Example 3 was performed except that the reaction temperature was maintained at 465° C., and a mixed gas of hydrogen 30 vol %/nitrogen 70 vol % was injected at a flow rate of 30 mL/min for 1.5 hours.

Comparative Example 4

A process the same as that in Comparative Example 3 was performed except that the mixed gas injection time was changed to 1 hour.

In each of Examples and Comparative Examples, the reduction degree of transition metal according to Equation 1 was measured through a Rietveld refinement analysis of XRD peaks of the preliminary precursor mixture, and the lithium recovery ratio was measured after mixing with water. The evaluation results are shown in Table 1 below.

TABLE 1

|   | Reduction degree of transition metal (MeO phase fraction + Li(NCM)O$_2$ fraction)/ (Me phase fraction) | lithium recover ratio (%) |
|---|---|---|
| Example 1 | 0.51 | 90.0 |
| Example 2 | 0.77 | 87.1 |
| Example 3 | 0.24 | 97.5 |
| Example 4 | 1.60 | 81.1 |
| Example 5 | 1.05 | 83.5 |
| Comparative Example 1 | 0.21 | 58 |
| Comparative Example 2 | 1.64 | 78.1 |
| Comparative Example 3 | 2.32 | 74.1 |
| Comparative Example 4 | 4.30 | 64.3 |

Referring to Table 1, when the reduction degree of transition metal was adjusted within the range according to the above-described embodiments of the present invention, a remarkably higher lithium recovery ratio was obtained compared to that from Comparative Examples.

What is claimed is:

1. A method of recovering an active metal of a lithium secondary battery, the method comprising:
preparing a cathode active material mixture comprising a lithium-transition metal oxide from a waste cathode of a lithium secondary battery;
reacting the cathode active material mixture with a reductive reaction gas to form a preliminary precursor mixture having a reduction degree of transition metal defined by Equation 1 in a range from 0.24 to 1.6; and
recovering a lithium precursor from the preliminary precursor mixture:

wherein the reduction degree of transition metal=
(MeO phase fraction+lithium-transition metal
oxide phase fraction)/(Me phase fraction)  [Equation 1]

wherein Me includes Ni and Co; and
wherein the MeO phase fraction, the lithium-transition metal oxide phase fraction and the Me phase fraction are measured by a Rietveld crystal structure analysis for X-ray diffraction (XRD) analysis peaks of the preliminary precursor mixture.

2. The method of recovering an active metal of a lithium secondary battery according to claim 1, wherein the lithium-transition metal oxide is represented by Chemical Formula 1:

$Li_xNi_aCo_bMn_cO_y$  [Chemical Formula 1]

wherein 0<x≤1.1, 2≤y≤2.02, 0<a<1, 0<b<1, 0<c<1, and 0<a+b+c≤1.

3. The method of recovering an active metal of a lithium secondary battery according to claim 1, wherein the reductive reaction gas includes hydrogen and a carrier gas, and a hydrogen concentration in the reductive reaction gas is in a range from 10 to 40 vol %.

4. The method of recovering an active metal of a lithium secondary battery according to claim 1, wherein a reaction temperature with the reductive reaction gas is in a range from 400 to 600° C.

5. The method of recovering an active metal of a lithium secondary battery according to claim 1, wherein the preliminary precursor mixture comprises preliminary lithium precursor particles and transition metal-containing particles, and
the transition metal-containing particles comprise Ni, Co, NiO, CoO, and MnO.

6. The method of recovering an active metal of a lithium secondary battery according to claim 5, wherein the preliminary lithium precursor particles comprise at least one of lithium hydroxide, lithium oxide, and lithium carbonate.

7. The method of recovering an active metal of a lithium secondary battery according to claim 5, wherein the recovering of the lithium precursor comprises washing the preliminary lithium precursor particles with water.

8. The method of recovering an active metal of a lithium secondary battery according to claim 5, further comprising selectively treating the transition metal-containing particles with an acid solution to recover a transition metal precursor in the form of an acid salt.

9. The method of recovering an active metal of a lithium secondary battery according to claim 1, wherein the reduction degree of transition metal of the preliminary precursor mixture is in a range from 0.24 to 1.0.

10. The method of recovering an active metal of a lithium secondary battery according to claim 1, wherein the forming of the preliminary precursor mixture comprises reacting the cathode active material mixture with the reductive reaction gas in a fluidized bed reactor under conditions controlled to achieve the reduction degree defined by Equation 1.

* * * * *